May 13, 1969

G. M. ZIEBER, JR 3,443,451

MOTION TRANSMITTING CORE ELEMENT
AND METHOD FOR MAKING SAME

Filed Aug. 18, 1966

INVENTOR.
George M. Zieber, Jr.
BY
Barnard, McGlynn & Reising
ATTORNEYS

United States Patent Office 3,443,451
Patented May 13, 1969

3,443,451
MOTION TRANSMITTING CORE ELEMENT AND
METHOD FOR MAKING SAME
George M. Zieber, Jr., King of Prussia, Pa., assignor to
Teleflex Incorporated, North Wales, Pa., a corporation
of Delaware
Filed Aug. 18, 1966, Ser. No. 573,286
Int. Cl. F16c 1/10
U.S. Cl. 74—501         14 Claims

ABSTRACT OF THE DISCLOSURE

Two different types of cable core elements are joined to form a single motion transmitting cable core element for a remote control assembly. A first cable has a first plurality of metal strands wound together on a long lead with a flat metal strip wound helically about the strands on a short lead. A second cable includes a second plurality of metal strands wound together on a long lead with a metal wire having a circular cross section wound helically about the strands on a short lead to form space convolutions. A bore is formed longitudinally into one end of the first cable and the wire of circular cross section is removed from a length of the second cable so as to expose a length of strands which are in turn fused together at their ends, such as by brazing. The strands of the second cable are then inserted into the bore of the first cable so that the flat strip of the first cable is in abutting engagement with the wire of circular cross section of the second cable. A fusing agent, such as bronze by brazing or silver solder by soldering, interconnects the first and second cables at the joint thus formed.

This invention relates to a motion transmitting remote control assembly which is normally operated to control a device by transmitting tension or compression in a curved path by means of a flexible cable core element and, more specifically, relates to the cable core element and the method for making same.

Motion transmitting remote control assemblies of the type to which the instant invention pertains are utilized to actuate a device from a remote position. Such remote control assemblies normally include a conduit which extends from a position adjacent the device to be controlled to the remote position and a motion transmitting cable core element is movably disposed in the conduit and is attached to the device to be controlled. Thus, upon movement of the motion transmitting cable core element within the conduit, the device may be actuated from the remote position.

The motion transmitting cable core elements which are utilized in such remote control assemblies are of various different forms or constructions. In many instances it is desirable and sometimes necessary to join two different types of cable core elements to form the single motion transmitting cable core element for a remote control assembly. For example, a cable core element of the type comprising a plurality of wire-like strands wound together on a long lead with a wire of circular cross section wound about the strands on a short lead to form spaced convolutions is frequently utilized in such remote control assemblies because the spaced convolutions of the wire wound about the strands form gear teeth which coact with a gear, which upon rotation moves the cable core element longitudinally within the conduit. It is only necessary, however, to utilize such a cable core element where the motion transmitting core element engages the gear since the remaining portion of the motion transmitting core element does not engage the gear and it is often desirable and sometimes necessary to utilize a cable core element having a different form or construction to provide other operating features or characteristics; to wit, in some installations it is desirable to utilize a cable core element which creates less frictional loads than the cable core having the spaced convolutions when moved in the conduit.

For these and many other reasons, therefore, it is desirable and/or necessary to join two cable core elements together. Heretofore such a joint has been produced by utilizing a rigid tube sleeve having an outer diameter of close tolerance and an inner diameter for receiving at least a portion of the respective ends of the two cable core elements to be joined together. The ends, or at least portions of the ends, of the two cable core elements are inserted into the sleeve and the sleeve is swaged about the cable core elements. In such a construction, the length of the sleeve is proportional to the load which is to be transmitted by the cable core element. The sleeve is, however, inflexible and the length of the sleeve determines the minimum bend radius about which the remote control assembly may be disposed. Thus, the longer the sleeve the larger is the minimum bend radius which the remote control assembly may be disposed about upon installation. Thus, in fabricating the prior art assemblies, the sleeves utilized to join two cable core elements were of a length commensurate with the anticipated load and the bend radius requirements so that various lengths of sleeves were utilized with substantially the same remote control assembly construction because the remote control assemblies were to be utilized in different environments or installations.

Therefore, it is an object and feature of this invention to provide a cable core element and a method of making same for use in a remote control assembly which comprises two cables joined together in a manner to provide a motion transmitting cable core element joint having a minimum length of rigidity and having strength nearly equal to the strength of the respective joined cable core elements.

Other objects and attendant advantages of the present invention will be readily appreciated as the same becomes better understood by reference to the following detailed description when considered in connection with the accompanying drawings wherein.

Figure 1:
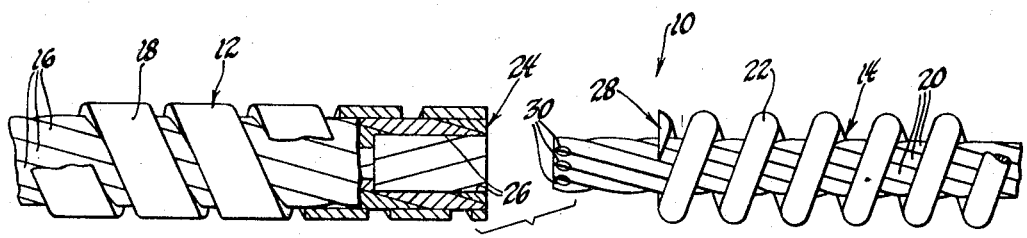
FIGURE 1 is a side elevational view partially broken away and in cross section of two cable core elements which are to be joined in accordance with the instant invention.
Figure 2:
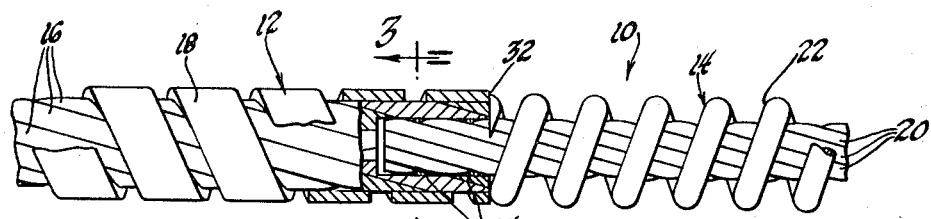
FIGURE 2 is a side elevational view partially broken away and in cross section of two cable core elements joined in accordance with the instant invention.

Referring now to the drawings, wherein like numerals indicate like or corresponding parts throughout the several views, a motion transmitting cable core element of the type utilized in a motion transmitting remote control assembly is generally shown at 10 and 10'. Referring now to FIGURES 1 and 2, the cable core element is a load transmitting assembly comprising a first cable, generally indicated at 12, and a second cable, generally indicated at 14.

The first cable 12 includes a first plurality of strands 16 wound together on a long lead. The strands 16 are preferably metal wire-like members. A flat strip 18, preferably of metal, is wound helically about the strands 16 on a long lead.

The second cable 14 includes a second plurality of strands 20 wound together on a long lead and also preferably made of metal wire. A metal wire 22 has a substantially circular cross scetion and is wound helically about the strands 20 on a short lead to provide spaced convolutions.

To join the cables 12 and 14 together, a first end, generally indicated at 24, of the first cable 12 is squared, as is the end of the cable 14; that is, the ends are cut in planes perpendicular to the respective longitudinal axes thereof. A bore 26 is then formed by drilling, grinding, or the like, so as to extend longitudinally into the end 24 of the cable 12. Preferably, the diameter of the bore 26 is within the periphery of the strands 16 as illustrated. A portion of the circular wire 22 is removed from about the strands 20 of the second cable 14 so as to expose a predetermined length of the strands, as illustrated in FIGURE 1. In removing the circular wire 22, a substantially planar inner face, generally indicated at 28, is provided. A fusing agent is utilized to secure the ends 30 of the strands 20 together, preferably by tinning. The strands 22 of the second cable 14 are then inserted into the bore 26 so that the flat strip 18 engages or abuts the wire 22 at the inner face 32 as shown in FIGURE 2. The ends of the strands 20 are spaced from the bottom of the bore 26 as illustrated in FIGURE 2. A fusing agent is then applied to interconnect or fuse together the cables 12 and 14 at the joint thus formed. This may be accomplished by brazing where the fusing agent is bronze or by soldering where the fusing agent is silver solder, such fusing agent being indicated at 34.

The motion transmitting core element, as illustrated in FIGURE 2, is then slidably supported in a conduit, tube-like member, or housing and transmits motion between two spaced positions.

Figure 3:
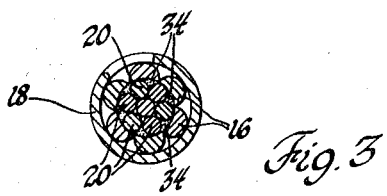
FIGURE 3 is a cross-sectional view taken substantially along line 3—3 of FIGURE 2.
Figure 4:
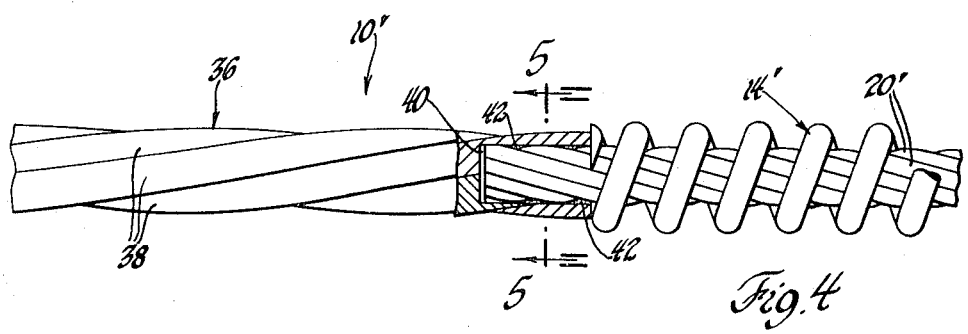
FIGURE 4 is a side elevational view partially broken away and in cross section of a different pair of cables joined together in accordance with the instant invention.
Figure 5:
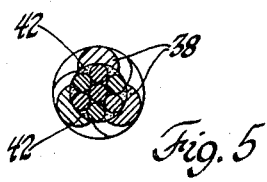
FIGURE 5 is a cross-sectional view taken substantially along line 5—5 of FIGURE 4.

FIGURE 4 shows an alternative embodiment wherein a cable 14', which is of the same structure as cable 14 in FIGURES 1 through 3, is joined to a cable generally indicated at 36. The cable 36 comprises three wire-like strands 38. Each strand 38 has a larger cross-sectional area than any one of the strands 20' of the conduit 14'. A bore 40 is formed in the end of the cable 36 and the strands 20' of the cable 14' are inserted into the bore 40. A fusing agent 42, such as bronze or silver solder, is utilized to fuse the cables 14' and 36 together.

Thus, in accordance with the instant invention, a motion transmitting core element of the type utilized in a motion transmitting remote control assembly may comprise cables of different structure having different operating characteristics and joined together in such a manner that the joint is nearly as strong as either of the cables and a minimum length of the core element is rigid because of the joint. Therefore, two cables joined together in accordance with the instant invention may be utilized in remote control assemblies in various different installations wherein the anticipated loads and required bend radii vary widely, which is a distinct improvement over the prior art remote control assemblies wherein the joint for cables to be utilized in various different installations had to be constructed specifically for each different installation.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting assembly comprising; a first cable including a first plurality of strands wound together on a long lead, said first cable having a bore extending longitudinally into said first plurality of strands from one end thereof, a second cable including a second plurality of strands wound together on a long lead, at least some of said second plurality of strands being disposed in said bore, and means interconnecting said first and second plurality of strands for joining said first and second cables.

2. An assembly as set forth in claim 1 wherein said means is a fusing agent securing said first and second plurality of strands together at the engagement therebetween whereby said cables are joined together.

3. An assembly as set forth in claim 2 wherein one of said cables includes a member wound helically on a short lead about the strands thereof.

4. An assembly as set forth in claim 3 wherein the other of said cables comprises three strands each of which has a larger cross-sectional area than any one of the strands of said one of said cables.

5. An assembly as set forth in claim 3 wherein said member comprises a metal wire having a circular cross section and providing spaced convolutions.

6. An assembly as set forth in claim 3 wherein said member comprises a flat strip of metal.

7. An assembly as set forth in claim 2 wherein said first cable includes a flat metal strip wound helically on a short lead about said first plurality of strands and said second cable includes a metal wire having a circular cross section and wound helically on a short lead about said second plurality of strands to provide spaced convolutions, said flat metal strip being in engagement with said metal wire adjacent said first end of said first cable.

8. An assembly as set forth in claim 7 wherein said fusing agent comprises silver solder.

9. An assembly as set forth in claim 7 wherein said fusing agent is bronze.

10. A motion transmitting core element for a motion transmitting remote control assembly comprising; a first cable including a first plurality of metal wire strands wound together on a long lead and a flat strip of metal wound helically thereabout on a short lead, a second cable including a second plurality of metal wire strands wound together on a long lead and a metal wire having a substantially circular cross sectional wound helically thereabout on a short lead, said first cable having a bore extending longitudinally into a first end thereof, the diameter of said bore being within the periphery of said first plurality of wire strands, said second plurality of wire strands having the ends thereof secured together by a fusing agent and disposed in said bore, said flat strip being in abutting engagement with said wire which is wound helically about said second plurality of wire strands of said second cable, and a fusing agent interconnecting said cables at the joint thus formed therebetween.

11. A method of joining first and second cables each of which includes a plurality of strands wound together, said method comprising; forming a longitudinal bore into the strands of said first cable at one end thereof, inserting at least some of the strands of said second cable into said bore, and applying a fusing agent to secure the strands of one cable to the strands of the other cable.

12. A method as set forth in claim 11 including fusing together the ends of said strands of said second cable before inserting them into said bore.

13. A method as set forth in claim 11 wherein said second cable includes a member wrapped helically on a short lead about said strands thereof and including the step of removing a portion of said member so that the strands extend a predetermined distance therefrom before inserting the latter into said bore.

14. A method as set forth in claim 11 wherein said first cable includes a flat metal strip wound helically on a short lead about the strands thereof and said second cable includes a wire of circular cross section wound helically on a short lead about the strands thereof and including the step of removing a portion of said wire of circular cross section adjacent the end of said second cable so that said wire of circular cross section engages said flat strip when said strands of said second cable are inserted into said bore.

References Cited

UNITED STATES PATENTS

| | | | |
|---|---|---|---|
| 906,113 | 12/1908 | Curtis | 64—2 |
| 1,477,618 | 12/1923 | Wetmore | 287—75 |
| 1,918,792 | 7/1933 | Arens | 74—502 |
| 1,970,702 | 8/1934 | Kuney | 64—2 |
| 2,427,727 | 9/1947 | Huntley et al. | 287—75 X |
| 3,000,197 | 9/1961 | Ruegg et al. | 64—2 |
| 3,011,775 | 12/1961 | MacLeod. | |
| 3,184,986 | 5/1965 | Kompanek, et al. | 74—501 X |

FOREIGN PATENTS

| | | |
|---|---|---|
| 634,953 | 3/1950 | Great Britain. |
| 800,661 | 5/1936 | France. |

FRED C. MATTERN, Jr., *Primary Examiner.*

CAROLYN F. GREEN, *Assistant Examiner.*

U.S. Cl. X.R.

29—474.4; 64—2; 287—77